United States Patent
Chandra et al.

(10) Patent No.: US 9,038,026 B2
(45) Date of Patent: May 19, 2015

(54) SYSTEM AND METHOD FOR AUTOMATING TEST AUTOMATION

(75) Inventors: Satish Chandra, Dobbs Ferry, NY (US); Achin K. Das, Bangalore (IN); Srinivas Mangipudi, Bangalore (IN); Debdoot Mukherjee, West Bengal (IN); Saurabh Sinha, New Delhi (IN); Suresh Thummalapenta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 868 days.

(21) Appl. No.: 13/274,749

(22) Filed: Oct. 17, 2011

(65) Prior Publication Data

US 2013/0097586 A1    Apr. 18, 2013

(51) Int. Cl.
G06F 9/44    (2006.01)
G06F 11/36    (2006.01)

(52) U.S. Cl.
CPC ................................ G06F 11/3684 (2013.01)

(58) Field of Classification Search
CPC ..................................... G06F 11/36–11/3696
USPC .................................................. 717/124–129
See application file for complete search history.

(56) References Cited

U.S. PATENT DOCUMENTS

| | | | |
|---|---|---|---|
| 4,688,195 A * | 8/1987 | Thompson et al. | 706/11 |
| 6,460,147 B1 * | 10/2002 | Cox | 714/38.12 |
| 6,698,012 B1 * | 2/2004 | Kossatchev et al. | 717/126 |
| 7,039,899 B1 | 5/2006 | Quiroga | |
| 7,296,188 B2 * | 11/2007 | Paternostro et al. | 714/38.14 |
| 7,437,614 B2 * | 10/2008 | Haswell et al. | 714/38.13 |
| 7,478,365 B2 * | 1/2009 | West et al. | 717/124 |
| 7,493,597 B2 * | 2/2009 | Hefner | 717/124 |
| 7,685,576 B2 * | 3/2010 | Hartmann et al. | 717/132 |
| 7,917,895 B2 * | 3/2011 | Givoni et al. | 717/124 |
| 7,934,127 B2 * | 4/2011 | Kelso | 714/38.1 |
| 8,347,147 B2 * | 1/2013 | Adiyapatham et al. | 714/38.1 |
| 8,347,267 B2 * | 1/2013 | Givoni et al. | 717/124 |
| 8,392,886 B2 * | 3/2013 | Sweis et al. | 717/125 |
| 8,756,571 B2 * | 6/2014 | Bergman et al. | 717/124 |
| 8,893,087 B2 * | 11/2014 | Maddela | 717/124 |
| 2003/0014734 A1 * | 1/2003 | Hartman et al. | 717/125 |
| 2004/0010735 A1 * | 1/2004 | Paternostro et al. | 714/38 |
| 2004/0107415 A1 * | 6/2004 | Melamed et al. | 717/124 |

(Continued)

OTHER PUBLICATIONS

Marinov, Darko, and Sarfraz Khurshid. "TestEra: A novel framework for automated testing of Java programs." Automated Software Engineering, 2001.(ASE 2001). Proceedings. 16th Annual International Conference on. IEEE, 2001.*

(Continued)

*Primary Examiner* — Matthew Brophy
(74) *Attorney, Agent, or Firm* — George R. McGuire; Bond Schoeneck & King, PLLC; John Pivnichny

(57) ABSTRACT

A computer system, method and computer program product for automatically converting, through automating-test-automation software, a manual test case representation (in a natural language), for testing a target software, into a machine-readable test case representation. In preferred embodiments, the machine-readable test case is in the form of a keyword-based test case that is made from action-target-data tuples. The automation-test-software uses a methodical process of trial-and-error to resolve ambiguities that are generally present (and generally resolvable by humans) in the manual test case representation.

12 Claims, 4 Drawing Sheets

(56) References Cited

U.S. PATENT DOCUMENTS

| | | | |
|---|---|---|---|
| 2007/0022407 A1* | 1/2007 | Givoni et al. | 717/124 |
| 2008/0115107 A1* | 5/2008 | Arguelles et al. | 717/124 |
| 2008/0222608 A1* | 9/2008 | Gartner et al. | 717/124 |
| 2009/0307665 A1* | 12/2009 | Sharma et al. | 717/124 |
| 2010/0257211 A1* | 10/2010 | Glowacki et al. | 707/803 |
| 2011/0202901 A1* | 8/2011 | Givoni et al. | 717/125 |
| 2011/0276944 A1* | 11/2011 | Bergman et al. | 717/124 |
| 2013/0263089 A1* | 10/2013 | Banerjee et al. | 717/124 |

OTHER PUBLICATIONS

Boyapati, Chandrasekhar, Sarfraz Khurshid, and Darko Marinov. "Korat: Automated testing based on Java predicates." ACM SIGSOFT Software Engineering Notes. vol. 27. No. 4. ACM, 2002.*

Burdonov, Igor, et al. "Kvest: Automated generation of test suites from formal specifications." FM'99-Formal Methods. Springer Berlin Heidelberg, 1999. 608-621.*

Mahmud, Jalal, and Tessa Lau. "Lowering the barriers to website testing with CoTester." Proceedings of the 15th international conference on Intelligent user interfaces. ACM, 2010.*

A. Cypher, D. C. Halbert, D. Kurlander, H. Lieberman, D. Maulsby, B. A. Myers, and a. Turransky, editors, Watch what I do: Programming by demonstration, MIT Press, Cambridge, MA, USA, 1993, http://acypher.com/wwid, pp. 1-11.

A. Fantechi, S. Gnesi, G. Lami, and A. Maccari, Application of linguistic techniques for use case analysis, 10th Anniversary IEEE Joint International Conference on Requirements Engineering, pp. 157-164, 2002.

T. Matthews, G. Leshed, E. M. Haber and T. Lau, Coscripter: Automating and sharing how-to knowledge in the enterprise, SIGCHI Conference on Human Factors in Computing Systems, pp. 1719-1728, 2009.

S. Gulwani, Dimensions in program synthesis, 12th International ACM SIGPLAN Symposium on Principles and Practice of Declarative Programming, pp. 13-24, 2010.

S. Jha, S. Gulwani, S. A. Seshia, and A. Tiwari, Oracle-guided component-based program synthesis, 32nd ACM/IEEE International Conference on Software Engineering, pp. 215-224, 2010.

JUnit.org, Resource for Test Driven Devleopment, URL http://junit.org, as of Jun. 22, 2011.

C. Kelleher and R. Pausch, Lowering the barriers to programming: A taxonomy of programming environments and languages for novice programmers, ACM Comput. Surv., 37:83-137, Jun. 2005.

T. Lau, P. Domingos, and D. S. Weld, Learning programs from traces using version space algebra, 2nd International Conference on Knowledge Capture, pp. 36-43, 2003.

T. Lau, C. Drews, and J. Nichols, Interpreting written how-to instructions, 21st International Joint Conference on Artifical Intelligence, pp. 1433-1438, 2009.

H. Lieberman, editor, Your wish is my command: Programming by example, Morgan Kaufmann Publishers Inc., San Francisco, CA, USA, 2001, http://web.media.mit.edu/~lieber/Your-Wish-Intro.html, pp. 1-8, as of Jun. 27, 2011.

G. Little and R. C. Miller, Translating keyword commands into executable code, 19th ACM Symposium on User Interface Software and Technology, pp. 135-144, 2006.

G. Little, T. A. Lau, A. Cypher, J. Lin, E. M. Haber, and E. Kandogan, Koala: Capture, share, automate, personalize business processes on the web, SIGGHI Conference on Human Factors in Computing Systems, pp. 943-946, 2007.

H. Liu and H. Lieberman, Programmatic semantics for natural language interfaces, CHI 2005 Extended Abstracts on Human Factors in Computing Systems, pp. 1597-1600, 2005.

J. Mahmud and T. Lau, Lowering the Barriers to Website Testing with CoTester, 14th International Conference on Intelligent User Interfaces, pp. 169-178, 2010.

D. Mandelin, L. Xu, R. Bodik, and D. Kimelman, Jungloid Mining: Helping to navigate the API jungle, 2005 ACM SIGPLAN Conference on Programming Language Design and Implementation, pp. 48-61, 2005.

D. Price, E. Riloff, J. Zachary, and B. Harvey, NaturalJava: A natural language interface for programming in Java, 5th International Conference on Intelligent User Interfaces, pp. 207-211, 2000.

A. Sinha, A. M. Paradkar, P. Kumanan, and B. Boguraev, A linguistic analysis engine for natural language use case description and its application to dependability analysis in industrial use cases, 2009 IEEE/IFIP International Conference on Dependable Systems and Networks, pp. 327-336, 2009.

A. Sinha, S. M. Sutton Jr., and A. Paradkar, Text2Test: Automated inspection of natural language use cases, 3rd International Conference on Software Testing, Verification and Validation, pp. 155-164, 2010.

S. Srivastava, S. Gulwani, and J. S. Foster, From program verification to program synthesis, 37th annual ACM SIGPLAN-SIGACT Symposium on Principles of Programming Languages, pp. 313-326, 2010.

W. F. Tichy and S. J. Koerner, Text to software: Developing tools to close the gaps in software engineering, FSE/SDP Workshop on Future of Software Engineering Research, pp. 379-384, 2010.

Watson, URL http://www-03.ibm.com/innovation/us/watson/index.html, as of Jun. 22, 2011.

* cited by examiner

SYSTEM AND METHOD FOR AUTOMATING TEST AUTOMATION

BACKGROUND

1. Field of the Invention

The present invention relates to the coding of machine readable instructions and more particularly to the machine readable instructions that can be performed to test the performance of a software program that is under development. Herein, the software being tested will sometimes be referred to as the "target software" to distinguish it from any "testing software" that is used to test the target software.

2. Description of the Related Art

Developers write unit test cases in the form of little programs, typically in a framework such as JUnit. Such a test suite can be run at the desired frequency, e.g., before each code commit, once daily, etc., without any manual intervention. Fixing regressions in the unit test suite is often the first line of defense in ensuring code quality. The story for system tests, or end-to-end tests for a complete application is different.

System tests start with identifying test scenarios from requirements and use cases, and creating test cases from the scenarios. Generally speaking, there are two types of test cases: (i) human readable test cases; and (ii) machine readable test cases. Human readable test cases are: (i) performed by human software testers; and/or (ii) converted by human software coders into equivalent machine readable test cases. Machine readable test cases are performed automatically, by machine, with little or no human intervention, which can be a highly efficient way of testing target software using test cases. This is why human software coders are often conventionally used to convert pre-existing human-readable test cases into machine-readable test cases.

BRIEF SUMMARY

One motivation for the present invention is to have non-programmers perform test automation while maintaining the comfort level they currently that they currently enjoy when drafting manual test cases in natural language. Preferably, at least some embodiments of the present invention will provide for creation of testing software where the creative process is characterized by a similar degree of informality, flexibility, ambiguity (without exactness) that is inherent in natural-language expressions. It is an objective of at least some embodiments of the present invention to provide a test automation method that allows the creator of the testing software to remain closer to her natural thought processes without significant intellectual distraction caused by the rigor demanded by scripting languages (even specialized scripting languages). Thus, a goal of at least some embodiments of the present invention is to improve the efficiency of automating the natural-language manual tests by automating the automation task.

In the contexts of test scripting, automating web-based processes, and guiding users in following "how-to" instructions, existing related techniques that automatically interpret stylized natural-language phrases require each user action, and the order among the actions, to be specified precisely. The approach of at least some embodiments of the present invention is to remove these restrictions and to attempt to resolve automatically different types of ambiguities inherent in a natural-language specification of a manual test case.

At least some embodiments of the present invention are directed to a system and method for automating test automation. At least some embodiments of the present invention address the problem of creating automated test scripts (that is, testing software) from manual test cases, specifically, in the context of keyword-driven automation. For example, given a manual test case with steps stated in the English language, a method according to the present invention may extract automatically a tuple (that is, an ordered list of items). In this example, a tuple $S=(a, t, d)$, consisting of the keyword or action a for step S, the target user-interface element t to which the action applies, the data value d (if any) mentioned in S.

A novel aspect of at least some embodiments of the present invention is that it automatically resolves different types of ambiguities using a general and powerful technique. The key idea underlying the approach of at least some embodiments of the present invention is that the presence of ambiguities gives rise to alternative interpretations of a test action. Instead of resolving the ambiguities up-front, methods according to the present invention can proceed by exploring an alternative until either the entire test case can be interpreted or the analysis reaches a point beyond which it cannot proceed. In the latter case, the analysis backtracks to the most recent ambiguity-resolving decision point, and then proceed to explore a different alternative. In this manner, the approach explores multiple potential flows, with the assumption that the selection of an incorrect alternative would cause the analysis to reach an impasse. The feature that makes the approach of at least some embodiments of the present invention especially powerful is that, in exploring a flow, it actually determines whether the inferred tuple is executable by using the application under test as an oracle. Thus, if a tool according to the present invention terminates by computing a complete sequence of tuples, the tuples are guaranteed to be capable of being performed by the machine reading the set of machine readable instructions of the testing software generated by preferred methods of the present invention.

The approach of at least some embodiments of the present invention consists of multiple phases. The first phase, Preprocessing, takes as input a manual test case (which could be specified in a plain-text document, a spreadsheet, etc.) and parses the test case to identify the individual test steps. The second phase, Segmentation, analyzes the test steps to identify the segments. The next phase, Ordering, orders the segments. The fourth phase, Target-Disambiguation, identifies the potential targets for each segment. Each of the segmentation, ordering, and target-disambiguation phases can encounter ambiguities, which result in decision points with multiple flows to be explored. The fifth phase tries to identify the data values, if any, that are mentioned in a segment. Finally, the technique attempts to execute the computed $(a, t, d)$ tuple on the browser. If it is unable to execute the tuple, it backtracks to the last decision point (that is, the most recent decision point), which may have occurred during segmentation, segment ordering, or target disambiguation.

According to one aspect of the present invention, a computer system includes: a processor set (including at least one processor); and a software storage device. The processor set is structured, programmed and/or connected in data communication with the software storage device so that the processor set performs machine-readable instructions stored on the software storage device. The software storage device includes the following: a manual test case database (including at least a first manual test case representation), ATA software, and first target software. The first manual test case is a manual test case for performing a test on the first target software. The ATA software is programmed to generate a first machine-readable test case representation corresponding to the first manual test case representation.

According to a further aspect of the present invention, ATA software is stored on a software storage device. The ATA software includes: an input module, an output module and an automating-test-automation module. The input module programmed to receive first target software and a first manual test case representation written for the first target software. The automating-test-automation module programmed to generate a first machine-readable test case representation corresponding to the first manual test case representation. The input module programmed to output the first machine-readable test case representation.

According to a further aspect of the present invention, a method is used to convert a manual test case representation into a machine-readable test case representation. The method comprising the following steps: (i) providing first target software and a first manual test case representation written for the first target software; (ii) generating a first machine-readable test case representation corresponding to the first manual test case representation using ATA software and without substantial human intervention; and (iii) outputting the first machine-readable test case representation.

BRIEF DESCRIPTION OF THE SEVERAL VIEWS OF THE DRAWINGS

The present invention will be more fully understood and appreciated by reading the following Detailed Description in conjunction with the accompanying drawings, in which.

DETAILED DESCRIPTION

Figure 1:
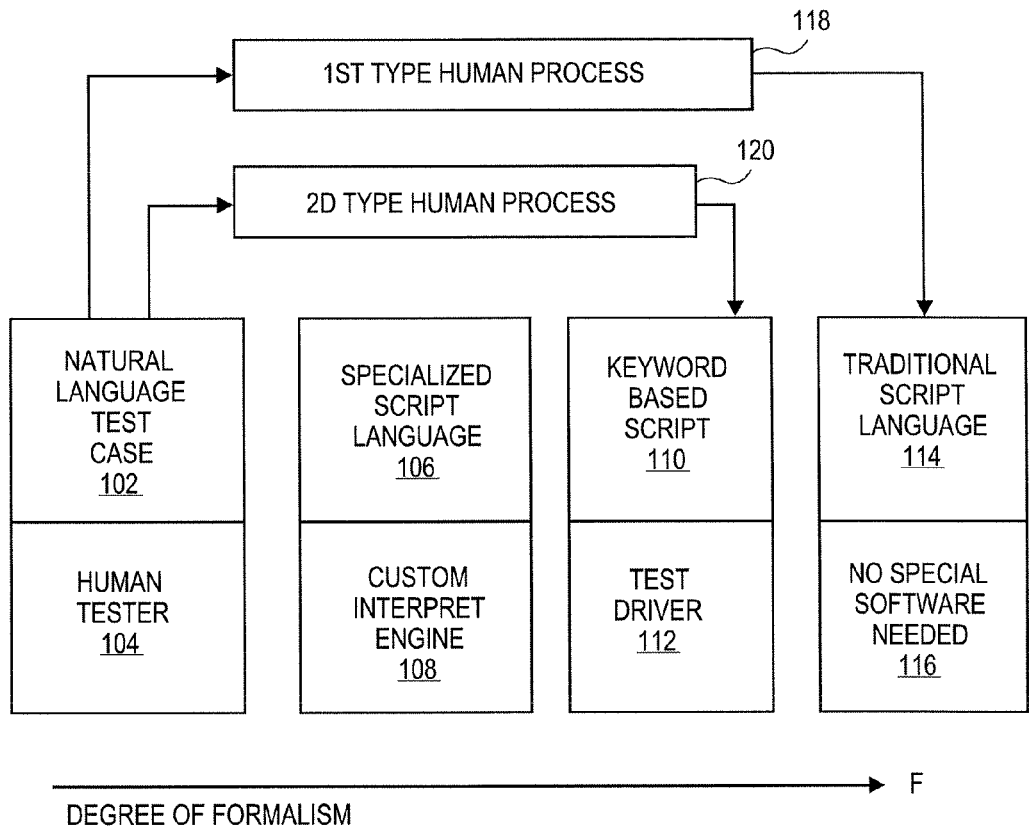
FIG. 1 is a schematic view of prior art relating to script generation and performance.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a machine-readable instruction performance system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with a machine-readable instruction performance system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A system test case, or an end-to-end test case, is typically written by software testers, and not by software developers themselves. The development of a system test case generally starts with identification of test scenarios based upon requirements and use cases, and then proceeds to creation of test cases based upon these scenarios. A "manual test case" is a sequence of test steps written in natural language. A manual test case is intended for use by a human (the tester), who performs a test manually through the application's graphical user interface ("GUI"). To help demonstrate what a manual test case is, an example manual test case for the bookstore application written by a professional tester follows:

```
1:  Launch the application through the link
    http://godel.in.ibm.com:8080/online-bookstore/
    Default . jsp
2:  Enter the intended book search name as "MySQL" at the
    "Title" Edit field and select "Category"
    as "All" by Drop down list and then Click "Search"
    Button
3:  Select a title from the list of all Search Results
    displayed and then click either on the image of the
    book or on Name of the Book
4:  Enter login and password, and click login
5:  Enter the Quantity "1" and Click on
    "Add to Shopping Cart" Button
6:  Verify "User Information" and Following "Item"
    Details of Selected Book
        Details
        Order \#
        Item Price
        Quantity
        Total
```

However, manual test cases do not have the benefit of repeatable and efficient test performance. Therefore, automatically executable test scripts generally need to be created from manual test cases, to attain repeatable, predictable and efficient testing. Test automation is the task of creating a set of machine readable instructions corresponding to a manual test case. Given that the number of manual test cases for a given piece of target software can be in the thousands, test automation is understood to be an expensive part of the software testing effort.

There are existing approaches for test automation, but these existing approaches each have drawbacks. For example, automated test cases can be coded into a scripting language (for examples, Java or VBScript) in the first instance, at the same time as, or even in place of, the drafting of the manual test cases. Because system test cases are most commonly created by non-developers, who may not possess the technical skills required for "coding" test cases in a precise notation, the natural-language expression of system tests is the one used most often in practice. Natural language incurs no training overhead. In other words, it would be costly to train all of the testers to be sufficiently skilled in scripting languages so that they could write test cases in scripting language in the first instance.

Another alternative for test automation is to use capture-replay tools, which record the tester's actions on the user interface to create an automatically executable test script. However: (i) the task of demonstrating the manual test cases on the GUI still costs human time; and (ii) the generated scripts can be difficult to maintain (for example, the scripts contain monolithic code with no modularization).

Another alternative for test automation is to use a keyword-driven automation framework (herein called a "keyword-based script"), in which a manual test case is specified as a precise sequence of "keywords" or calls to executable subroutines, along with the relevant arguments. This sequence can then be performed automatically by a test driver. However, manual identification of keywords costs human time. Moreover, it requires precise specification of each user action, and the order among the actions. An example of a keyword-based script, consisting of triplets of action, the target of the action, and any relevant data as follows:

```
 1:  <goto, http://godel.in.ibm.com:8080/online-bookstore/
        default . jsp,>
 2:  <enter, title, MySQL>
 3:  <select, category, all>
 4:  <click, search,>
 5:  <select, title,>
 6:  <enter, login, guest>
 7:  <enter, password, guest>
 8:  <click, login,>
 9:  <enter, quantity, 1>
10:  <click,add to shopping cart,>
```

Finally, another recognized alternative for test automation is to write manual test cases in a specialized test scripting language that has the feel of natural language, but allows for machine-readability of the instruction set written in the natural-language-like scripting language. However, until such languages see broader adoption, organizations will continue to have to pay the cost of test automation.

It is natural to ask why manual test cases are so prevalent, if they are bound to have a latent cost of test automation. Why not write automated test cases to begin with, for example, in the scripting language of a testing tool? Because system test cases are most commonly created by non-developers, who may not possess the technical skills required for "coding" test cases in a precise notation, the natural-language expression of system tests is the one used most often in practice. Natural language incurs no training overhead.

An alternative is to write manual test cases in a specialized test-scripting language that has the feel of natural language but allows for machine readability. ClearScript is an example of such a language. ClearScript permits some elision of rigor of a full programming language, but is still fairly structured compared to natural language. Until such a language sees broader adoption, organizations will continue to have to pay the cost of test automation. The ClearScript representation of a test case follows:

```
 1:  go to "http://godel.in.ibm.com:8080/online-bookstore/
        Default . jsp"
 2:  enter "MySQL" into the "Title" textbox
 3:  select "All" from the "Category" listbox
 4:  click the "Search" button
 5:  click the "MySQL & PHP From Scratch" link
 6:  enter "guest" into the "Login" textbox
 7:  enter your password into the "Password" textbox
 8:  click the "Login" button
 9:  enter "1" into the "Quantity" textbox
10:  click the "Add to Shopping Cart" button
```

FIG. 1 schematically shows: (i) a test case being translated from human-readable form to machine-readable form by a human being (see block 118); and (ii) a test case being translated from human-readable form to machine-readable form by a ATA software (see block 120). In the specific, schematic example of FIG. 1, the human being is translating the human-readable test case into a traditional script language, but human beings probably have also translated into other machine-readable test case forms, such as specialized script language and keyword-based script. In the specific, schematic example of FIG. 1, the ATA software of the present invention translates the human-readable test case into a keyword-based script, but other ATA software embodiments of the present invention may translate into other machine-readable test case forms, such as specialized script language and traditional script language.

As shown in FIG. 1, schematic 100 includes: natural language test case representation 102; human tester agent of performance 104; specialized script language test case representation 106; custom interpretation engine agent of performance 108; keyword-based script test case representation 110; test driver agent of performance 112; traditional script language 114; no-special-software-needed agent of performance 116; and arrow F shows the increasing direction of formalism and/or precision. First type human process 118 is conventionally used to convert, with no intellectual effort required, a natural language test case into a traditional script language test case. What this means is that a human being (more specifically a human being proficient in writing scripts in traditional languages) must actively intervene and use her intellect to convert from the natural language to traditional script test case. According to the present invention, a software-controlled process 120 is used to convert a natural language test case into a conventional keyword-based script test case. In human processes, like process 118, a human being (one who has been trained in the art of writing in machine-readable language) must actively intervene and use her intellect to convert from the natural language to keyword-based script test case. Some comments on test driver 112 will now be made. The difference between a custom scripting language and a keyword-based script is in the degree of formalism. A custom scripting language is typically close to natural-language expressions (although with a very restricted vocabulary), whereas a keyword-based script is closer to code than natural language. They also differ in generality: a keyword-based representation can be handled by many tools—it is more tool-agnostic—whereas a custom scripting language is tied to one tool. A custom interpretation engine parses the expressions in the custom scripting language and executes the application (under test) directly, without any intermediary, standard commercial/open-source interpretation engine (for example, the Rational Functional Tester, Selenim). In contrast, a test driver uses the keywords to invoke a standard interpretation engine, which actually executes the application. Thus, the effort in implementing test driver 112 will generally be significantly less than implementing custom interpretation engine 108.

It is generally easier for non-programmers to write keyword-based scripts than it is for them to write in a scripting language, like Java. At the one end of the spectrum of schematic 100, tests are stated in a "stylized" natural language; stylized, because as the reader can see in FIG. 1, test cases are written in a certain pattern. At the other end, system tests are expressed in a programming language. In between these extremes, there are two approaches with intermediate degrees of formality: specialized test-scripting languages that attempt to retain the flavor of natural-language expression, and a sequence of keywords or names of executable subroutines, where for each call, the user-interface element and data values need to be identified. The keyword-based script approach can also have a slightly less formal variant, where a keyword is a natural-language expression.

Mention "test case", and it conjures up image of a script or a program that exercises a system under test. In industrial practice, however, test cases often start out as steps described in natural language. These are essentially directions a human tester needs to follow to interact with an application, exercising a given scenario. Because tests need to be performed repeatedly, such manual tests then usually have to go through test automation to create scripts or programs out of them. As mentioned above, test automation can be expensive in programmer time.

The present invention is directed to systems and methods for automating test automation. The input for the method is a sequence of steps written in natural language (generally by an individual who is a non-programmer software tester). The output is a piece of test software which is a set of machine readable and executable instructions for performing a test on a target software. The test software will generally take the form of a sequence of procedure calls, with accompanying parameters, that can drive the application, through a test driver, without substantial human intervention to perform test(s) on the target software. The technique is based on looking at the natural language test steps as consisting of segments that describe actions on targets, except that there can be ambiguity in the action itself, in the order in which segments occur, and in the specification of the target of the action. The technique resolves these ambiguities by back-tracking, until it can synthesize a successful sequence of calls.

The techniques used in the present invention have been surprisingly effective in automating manual test cases as written by professional testers. In experiments, professional testers wrote test cases for two web applications. A method according to the present invention successfully automated 85% of the test cases end to end.

Figure 2:
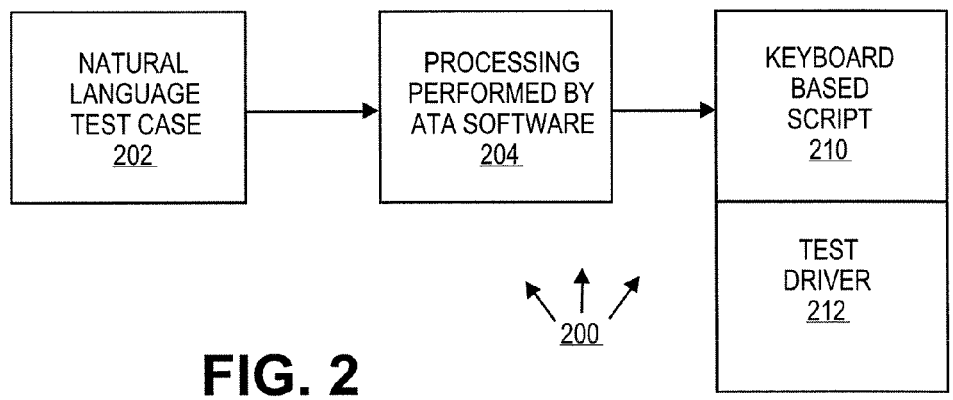
FIG. 2 is a schematic view of script generation and performance according to the present invention.

FIG. 2 shows schematic 200 including: natural language test case representation 202; processing performed by automating-test-automation ("ATA") software block 204; keyword-based script 210; and test driver 212. As may be seen by comparing schematic 100 with schematic 200, at least some embodiments of the present invention replace the second type human process 120 with processing performed by software 204 (that is, a set of machine readable instructions) with little or no active human intervention. This kind of software will sometimes herein be called ATA software. ATA software may be stored on a software storage device (see DEFINITIONS section).

In this way, the required active human intervention can be cut back and limited to the generation of the natural language representation of the test script. The ATA software, the keyword-based script it generates and the test driver do the rest of the work, with little or no active human intervention. In this way, the software testers, who are generally non-programmers, confine their work to the context of writing natural language and thereby maintain a high comfort level that they have due to the degree of informality, flexibility, ambiguity (without exactness) that is inherent in natural-language expressions. The non-programmers can limit their writing to the natural language context which is closer to their thought processes than the rigor demanded by even the conventional specialized scripting languages (which are designed to approximate natural language). Thus, one goal of at least some embodiments of the present invention is to improve the efficiency of automating the natural-language manual tests by automating the process of translation from a natural language test case representation to a keyword-based script test case.

While the keyword-based script test case generated by the ATA software maybe identical to a comparable prior art keyword-based test case written by a human being (for example, the keyword-based script set forth above in the Background section was actually written by ATA software according to the present invention), there are advantages to accomplishing this process through software rather than by human effort.

Other embodiments of the present invention may automate the generation of other types of machine-readable test case representations see DEFINITIONS section) besides keyword-based test case representations (see DEFINITIONS section).

Preferred embodiments of the present invention do not necessarily "understand" natural language, at least not in advanced ways. Rather, preferred embodiments of the present invention utilize the observation that the style in which testers write manual steps in a natural language tend to have a very predictable structure. This predictable structure generally consists of segments, where a segment is an instruction for the tester to perform an action on a user interface. Examination of over a thousand test steps taken from manual tests of real applications supports this observation. Moreover, the manual test case representations tend to be characterized by a restricted vocabulary (for example, consisting of nouns that are pertinent for the application being tested and verbs that specify actions on user-interface elements). This observation is also borne out by experiments.

However, even with the predictable syntactical structure and restricted vocabulary, the problem of converting a manual test case representation into a machine-readable test case representation (for example, a keyword-based test case representation) is still not a trivial problem. Although the manual test cases are written in a stylized form, the ambiguities inherent in natural language instructions, which may pose no challenges for human interpretation, can make mechanical interpretation difficult. The challenges of interpreting even the predictably structured natural-language expressions written by typical software testers will be discussed below. As a relatively simple example, consider the following natural language instruction: "Select a title from the list of Search results displayed and then click either on the image of the book or on the Name of the Book." At first read, it would appear that there are two segments of imperative commands, select and click, but there is only one action to be done on the browser.

There are many instances of such, and more complex, cases of ambiguity that were found by examining a large corpus of actual, pre-existing manual test case representations. There can be ambiguity in the action itself, in the order in which segments occur, and in the specification of the target of the action. Moreover, the ambiguities and the stylized form of expression can vary significantly from one application to the other. Although application-specific rules and heuristics are required to handle variations, a general approach that, to some extent, is variation-agnostic would be very valuable. Some embodiments of the present invention provide for such an approach.

The problem of automating test automation can be considered as an instance of program synthesis where the goal is to discover a program that realizes user intent. In human-readable test cases, the user intent is stated in stylized natural language, as a sequence of manual test steps, and the goal is to synthesize a mechanically interpretable test script. At least some embodiments of the present invention may be helpfully considered as an instance of "end-user" programming, where the intent is to bridge the gap between natural-language and programming-language expressions, and to lower the barriers to programming for end-users and novice programmers.

One idea underlying at least some embodiments of the present invention is that the presence of ambiguities gives rise to alternative interpretations of a test action. Instead of resolving the ambiguities up-front, the process can proceed by exploring an alternative until either the entire test case can be interpreted or the analysis reaches a point beyond which it cannot proceed. In the latter case, the analysis backtracks to the last decision point, and explores a different alternative. In this manner, the approach explores multiple potential flows, with the assumption that the selection of an incorrect alternative would cause the analysis to reach an impasse, eventually. One feature that makes at least some embodiments of the present invention especially powerful is that, in exploring a flow, preferred methods according to the present invention will determine whether an inferred tuple (or sequence of inferred tuples) are truly machine-readable and machine performable by using the application under test as an oracle. Thus, if the tool terminates by computing a complete sequence of tuples, the tuples are guaranteed to execute.

Figure 3:
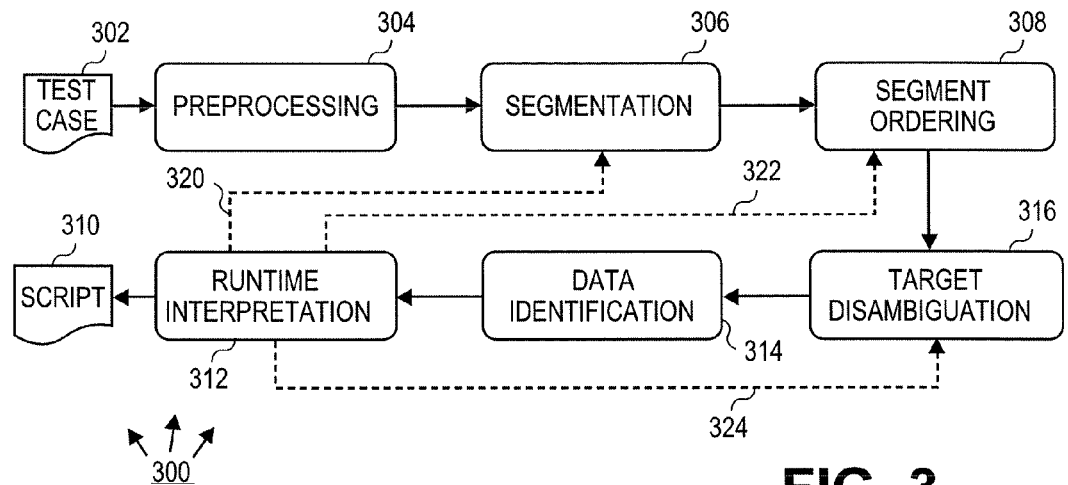
FIG. 3 is a flowchart for a first method according to the present invention.

FIG. 3 shows schematic 300 including: test case block 302; preprocessing block 304; segmentation block 306; segment ordering block 308; script block 310; runtime interpretation block 312; data identification block 314; target disambiguation block 316; first backtrack path 320; second backtrack path 322; and third backtrack path 324. FIG. 3 presents an overview of a backtracking-based automation technique according to the present invention and shows the different phases of the analysis. The first phase, preprocessing 304, takes as input a manual test case 302 (which could be specified in a plain-text document, a spreadsheet, etc.) and parses the test case to identify the individual test steps. The second phase, segmentation 306, analyzes the test steps to identify the segments. The next phase, segment ordering 308, orders the segments. The fourth phase, target disambiguation 316, identifies the potential targets for each segment. Each of the segmentation, ordering, and target-disambiguation phases can encounter ambiguities, which result in decision points with multiple flows to be explored. The fifth phase, data identification 314, tries to identify the data values, if any, that are mentioned in a segment. Finally, the technique attempts to execute the computed (a, t, d) tuple on the browser at runtime representation step 312. If the computer is unable to execute the tuple, it backtracks 320, 322, 324 to the most recent decision point (sometimes herein called the "last decision point"), which may have occurred during segmentation, segment ordering, or target disambiguation.

An embodiment of the present invention has been implemented and several aspects of the approach have been evaluated. A first study measured the success of the approach in automatically creating a keyword-based test case representation for a suite of 23 end-to-end manual test cases for two open-source web applications. These tests were written by professional testers, who were not aware that there would be an attempt to use ATA software to automatically convert their work product into a machine-readable test case representation. The implemented embodiment of the present invention was able to fully automate 19 out of these 23 manual test case representations. In the remaining 4 test cases, the approach encountered some step that it could not automate, and human intervention would be required to fully achieve a machine-readable test case representation. It is noted that some embodiments of the present invention may provide for this kind of human intervention where a human and the ATA software work co-operatively to generate a machine-readable test case. Even when some human intervention is required, preferred embodiments of the present invention will drastically reduce the amount of time and attention that the human must provide in generating the machine-readable test case representation.

In a second study, the success of segmentation and correct interpretation was studied, where each segment was an (a, t, d) tuple in a large test corpus containing over a thousand test steps. This segmentation study showed that, in real test corpuses, about half of the individual test steps contained multiple segments, and across all these segments (which numbered well over a thousand), the tool was able to correctly reconstruct over 80% of them.

A manual test case was set forth above, but will now be set forth again for ease of reference:

```
1:   Launch the application through the link
        http://godel.in.ibm.com:8080/online-bookstore/
        Default . jsp
2:   Enter the intended book search name as "MySQL" at the
        "Title" Edit field and select "Category"
        as "All" by Drop down list and then Click "Search"
        Button
3:   Select a title from the list of all Search Results
        displayed and then click either on the image of the
        book or on Name of the Book
4:   Enter login and password, and click login
5:   Enter the Quantity "1" and Click on
        "Add to Shopping Cart" Button
6:   Verify "User Information" and Following "Item"
        Details of Selected Book
        Details
        Order \#
        Item Price
        Quantity
        Total
```

As mentioned above, a manual test case is stated in natural language and consists of a sequence of test steps. A segment is a phrase in a test step that contains one verb (corresponding to a user-interface action) and one or more nouns (representing the user-interface elements on which the action is performed). For example, the manual test case above consists of six test steps. An example of a segment is "Enter login and password" in test step 4.

The goal of preferred embodiments of the present invention is to infer an automatically interpretable action-target-data (ATD) tuple, which is a triple (a, t, d) consisting of an action, a target user-interface element, and a data value. These tuples have been used in the prior art as a basis for human generation of keyword-based test case representations. A keyword-based test case representation (which corresponds to the above manual test case representation) was set forth above, but will now be repeated for clarity of illustration:

```
1:   <goto,http://godel.in.ibm.com:8080/online-bookstore/
        default . jsp,>
2:   <enter, title, MySQL>
3:   <select, category,all>
4:   <click, search,>
5:   <select, title,>
6:   <enter, login, guest>
7:   <enter, password, guest>
8:   <click, login,>
9:   <enter, quantity, 1>
10:  <click, add to shopping cart,>
```

In preferred embodiments of the present invention, instead of having a human being generate this keyword-based test case representation, it is instead generated automatically, at least in substantial part, by ATA software. This example illustrates several challenges for automated interpretation.

One challenge is identification of valid segments. A manual test step can consist of multiple segments combined using coordinating conjunctions, such as "and", which can complicate interpretation. For example, consider step 4. This step consists of two segments: (i) Enter login and password; and (ii) click login. However, simply splitting a manual test step based on conjunctions would create an invalid segment password, which does not contain any verb. The present invention's approach considers all possible segmentations based on coordinating conjunctions, explores each alternative, and eventually arrives at the correct segmentation, illustrated by the ATD tuples 6-8 in above keyword-based test case representation.

Another challenge is identification of irrelevant tuples. A test step can contain valid segments that do not correspond to actions on the user interface. Such a segment may specify a verification step or it may be totally irrelevant. Because of the informality of natural-language expressions, irrelevant segments that are meant to be informative, or provide a clarification, are often present in manual tests. For example, consider step 3 of the above manual test case representation, which seems to suggest two actions, indicated by the following verbs: (i) select; and (ii) click. However, the tester needs to perform only one action: selecting from a list of books by clicking on a link or an image. The approach of preferred embodiments of the present invention explores both segments and, eventually, discards one to compute only one ATD tuple-tuple, specifically tuple 5, in the above keyword-based test case representation.

Another challenge is determining tuple order of multiple tuples. In scenarios where a test step contains multiple actions, the actions may need to be ordered for executing the test step successfully. Consider the following test step, written by a professional tester: "Select priorities from the administration tab. To execute this step, the administration tab must be selected before priorities can be selected." Preferred embodiments of the present invention are able to compute two ATD tuples in the correct order: (i) <goto,administration tab,>; and (ii) <select,priorities,>.

Another challenge is disambiguating targets. In some cases, there can be multiple targets for a given action in a segment. This happens in scenarios where either the tester does not mention the target properly or the application under test includes multiple targets with the same label. Consider again step 3 of the manual test set forth above. The application web page, on which the step is applicable, can contain multiple user-interface elements labeled "Title", such as: a text box, and zero or more HTML links (depending on the results of a book search). Thus, the instruction to "select a title" poses target ambiguity, which a mechanical interpretation needs to address, as the backtracking-based approach does. An approach of preferred embodiments of the present invention explores all potential targets labeled "Title" and, for each target, it attempts to interpret and execute the next test step (step 4), which is applicable on the login page only. While exploring the text-box target, the tool does not reach the login page and, therefore, is unable to execute step 4 during the runtime interpretation step. Therefore, it backtracks and explores a link labeled "Title". In this second exploration, it is able to complete step 4 successfully and will tentatively consider this second target disambiguation option as correct (at least unless and until problems subsequently emerge during further runtime performance).

Figure 4:
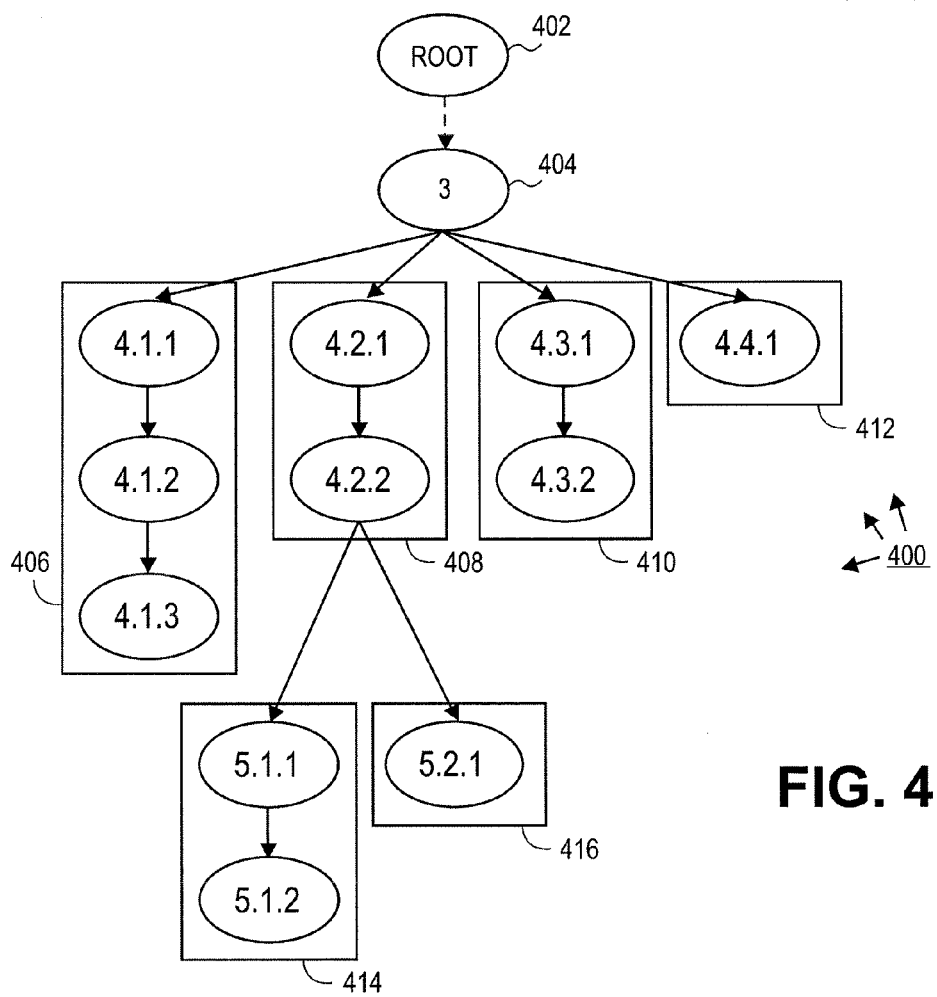
FIG. 4 is a flowchart for a second method according to the present invention.

FIG. 4 and Algorithms 1, 2, and 3 show key algorithms of the backtracking technique and will now be discussed. The core idea of some embodiments of the present invention is to take an imprecise test step in English and generate various candidate precise ATD tuples that can be performed by the runtime. Whenever a candidate ATD tuple cannot be generated or performed, these preferred embodiments will automatically backtracks to other possible tuple candidates (which candidates are differentiated by including a different tuple or having a different tuple order).

FIG. 4 is a flowchart including: root step 402; compute seglists step 404; and seglists 406, 408, 410, 412, 414, 416. Each of the seglists contains numbered steps (for example, step 4.1.1); An index for these numbered steps follows:

|  |  |
|---|---|
| (4) | enter login and password, and click login |
| (4.1.1) | enter login |
| (4.1.2) | password |
| (4.1.3) | click login |
| (4.2.1) | enter login |
| (4.2.2) | password, and click login |
| (4.3.1) | enter login and password |
| (4.3.2) | click login |
| (4.4.1) | enter login and password, and click login |
| (5.1.1) | enter quantity "1" |
| (5.1.2) | click on "Add to Shopping Cart" button |
| (5.2.1) | enter quantity "1" and click on . . . button |

Below it will be discussed how Algorithms 1, 2 and 3 work through the process flow of flowchart 400. More specifically, after the first two steps of the keyword-based test case have been determined at step 402, and the third step has been determined at step 403, the algorithms work on determining the fourth step, which processing is shown in detail in flowchart 400. As will be explained in detail below, ATA software according to the present invention works through the blocks of flowchart 400 in the following order: (i) processing proceeds through blocks 402, 403 and 406, where it is determined that seglist candidate 406 does not work; (ii) processing proceeds through blocks 402, 403, 408 and 414, where it is determined that seglist candidate 408/414 does not work; (iii) processing proceeds through blocks 402, 403, 408 and 416, where it is determined that seglist candidate 408/416 does not work; and (iv) processing proceeds through blocks 402, 403, and 410, where it is determined that seglist candidate 410 does work as step 4 of the keyword-based test case representation being developed by the ATA software.

In some embodiments of the present invention, the ATA software might work through the blocks 402, 404 and 412 as well. As one example, this may happen in embodiments where all possible parsings of the manual test case representation are run and compared according to some predetermined criteria to maximize the probability that the keyword-based test case representation truly reflects the intent of the tester who drafted the manual test case representation. As another example, this may happen if no workable solutions can be found for subsequent steps and this unworkability is caused because 402-to-404-to-412 is the process flow that is actually correct in light of subsequent steps.

Algorithm 1: (i) is called HandleTestCase (Tcase, index); (ii) requires a test case Tcase and index; and (iii) provides output in the form of "SUCCESS" or "FAIL." Algorithm 1 follows:

```
1:   if index > TCase.length then
2:       return SUCCESS
3:   end if
4:   TestStep = TCase[index]
5:   //Compute possible segments
6:   List<SegList> seglists = ComputeSegLists(TestStep)
7:   for all SegList sl ∈ seglists do
```

```
8:       OrderSegments(sl)
9:       ret = HandleSegList(sl, 0)
10:      if ret == SUCCESS then
11:          return SUCCESS
12:      end if
13:      //Backtrack
14:  end for
15:  return FAIL
```

The HandleTestCase algorithm accepts a test case and analyzes each step of the test case recursively. In particular, for each test step, HandleTestCase computes all candidate lists of segments, referred to as SegLists, using ComputeSegLists (Algorithm 1, Line 6). Given a test step, ComputeSegLists splits the test step into various SegLists based on conjunctions such as and from. If the test step includes n conjunctions, ComputeSegLists generates $2^n$ SegLists, representing all possible combinations of segments. For example, consider Step 4 of the manual test case representation set forth above. This step includes two conjunctions (specifically two occurrences of "and"). Therefore, ComputeSegLists generates 4 SegLists. As shown in FIG. 4, flowchart 400 shows all four SegLists for Step 4, respectively blocks 406, 408, 410, 412. Here, SegList 406 includes three segments 4.1.1, 4.1.2, and 4.1.3. The notation used herein is "a.b.c", where "a", "b", and "c" represent the test step index, the SegList index and segment index, respectively. Among these four segment lists, SegList 410 is the correct segment list that helps in successful performance of Step 4. Next is described how the technique correctly determines segment list 410 from among segment list candidates 406, 408, 410, 412.

The HandleTestCase algorithm analyzes each SegList candidate 406, 408, 410, 412. In particular, HandleTestCase uses OrderSegments (Line 8 of Algorithm 1) to order segments within a SegList based on heuristics. Such an ordering is required when conjunctions such as "from" are used in the test step. For example, consider the test step T1: "select priorities from the administration tab." The segment "select priorities" cannot be performed unless the administration tab has first been selected. To address this issue during segmentation, special conjunctions are identified, such as "from" or "under" that require ordering among segments. Next the verb ("goto") is introduced in the succeeding segment and those segments are sorted. The primary reason to introduce a verb is to satisfy the segment criteria that each segment should contain one verb. For the test step T1, the technique generates two ordered segments as follows: (i) goto administration tab; and (ii) select priorities.

After ordering segments, HandleTestCase invokes Algorithm 2 (HandleSegList, to be discussed in more detail below) to analyze and execute a SegList that is currently under consideration. If HandleSegList fails, HandleTestCase automatically backtracks to other SegLists such as seglist 408. Algorithm 2: (i) has a full name of HandleSegList (TCase, tindex, seglist, segindex); (ii) requires: TCase and index tindex, SegList seglist and index segindex; (iii) returns output in the form of "SUCCESS" or "FAIL." Algorithm 2 follows:

```
1:   if seglist.size( ) == segindex then
2:       //Proceed to next test step
3:       return HandleTestCase(TCase. tindex + 1)
4:   end if
5:   Segment scg = seglist[segindx]
6:   List<TSegment> dseglist = DisambiguateNV(scg)
```

-continued

```
 7:    for all TSegment localseg ∈ dseglist do
 8:        List<ATDTuple> adtList = ExtractATD(localseg)
 9:        if adtList.size( ) == 0 then
10:            Continue
11:        end if
12:        ret = ExecuteATDList(seglist, segindex, adtList, 0)
13:        if ret == SUCCESS then
14:            return SUCCESS
15:        end if
16:        //Backtrack
17:    end for
18:    return FAIL
```

The HandleSegList algorithm accepts a list of segments and extracts ATD tuples from each segment of the list. Before extracting ATD tuples, HandleSegList uses DisambiguateNV (Line 6 of Algorithm 2) to disambiguate nouns and verbs within a segment. The primary reason is that often the same word can be used as both a verb and a noun. For example, consider the Segment 4.1.3 (see FIG. 4 index set forth above): click login. Here, both "click" and "login" can be verbs or nouns, posing challenges in identifying actions and targets from segments. To address this issue, preferred methods according to the present invention explicitly generate multiple tagged segments, represented as TSegment, for each segment. A tagged segment is a segment where some words in the segment are explicitly tagged with a parts-of-speech (POS). For example, for the preceding segment, DisambiguateNV generates the following tagged segments: (4.1.3.1) click/VB login/VB; (4.1.3.2) click/VB login/NN; (4.1.3.3) click/NN login/VB; and (4.1.3.4) click/NN login/NN. Here, VB and NN represent verb and noun, respectively. These four tagged segments describe all four possible combinations of the original segment. For each tagged segment, HandleSegList uses ExtractATD for extracting an ATD tuple from a tagged segment. Initially, ExtractATD checks whether the segment satisfies the segment criteria whether segment contains only one verb. For each segment that satisfies the preceding criteria, ExtractATD generates an ATD tuple (this will be discussed in more detail below). There can be multiple ATD tuples for each tagged segment. HandleSegList next invokes Algorithm 3 (called ExecuteATDList) to execute all ATD tuples generated for a tagged segment.

Now will be explained how backtracking happens if ExtractATD fails to generate an ATD tuple for a segment. Consider that HandleSegList is invoked with SegList 406. When Handle-SegList analyzes segment 4.1.2 (password), ExtractATD identifies that there is no verb in the segment and returns failure to HandleTestCase. In this scenario, HandleTestCase backtracks and invokes HandleSegList with SegList 408 as the next candidate to analyze. Since both segments (4.2.1 and 4.2.2) in seglist 408 satisfy the criteria for segmentation, ExtractATD generates the following ATD tuples for SegList 408 and invokes ExtractATD with following tuples:
(4.2.1) <enter, login, >
(4.2.2) <click, login, >

Algorithm 3: (i) has a full name of ExecuteATDList (seglist, segindex, sslist, index); (ii) requires an ATDTuple atuple; and (iii) provides output in the form of "SUCCESS" or "FAIL." Algorithm 3 follows:

```
 1:    if sslist.size( ) == index then
            //Proceed to the next segment
 3:        return HandleSegList(seglist, segindex + 1)
 4:    end if
 5:    SS scriptstep = sslist[index]
 6:    List<SS>dislist = DisambiguateTarget(atuple)
 7:    for all SS localss ∈ dislist do
 8:        ret = InterpretStep(localss)
 9:        if ret == SUCCESS then
10:            //Proceed to the next ATD tuple
11:            ret = ExecuteATDList(seglist, segindex, sslist,
                                     index + 1)
12:            if ret == SUCCESS then
13:                return SUCCESS
14:            end if
15:        end if
16:        //Backtrack
17:    end for
18:    return FAIL
```

The ExecuteATDList algorithm executes a list of ATD tuples of a tagged segment using runtime. If it successfully executes all tuples, ExecuteATDList automatically invokes HandleSegList with the next segment in the list.

Given an ATD tuple, ExecuteATDList first identifies the target element in the application under analysis using DisambiguateTarget (Algorithm 3, Line 5). Often, it is identified that that there can be multiple target elements for the target t of an ATD tuple. In such scenarios, DisambiguateTarget collects all candidate target elements and interprets each element using InterpretStep. InterpretStep executes the ATD tuple using runtime. If the step succeeds, ExecuteATDList invokes the next ATD tuple, but otherwise backtracks to another alternative identified by DisambiguateTarget (Algorithm 3, Loop 7-17).

Next will be explained another backtracking scenario, where backtrack happens based on runtime. Consider that InterpretStep successfully performed ATD tuple of segment 4.2.2. However, logging into application under analysis does not succeed, since the ATD tuple for entering the password is missing as shown in ATD tuples generated for seglist 408, above. If there exists a verification step after Step 4, it can be automatically identified whether the verification step is passed or not, and then either proceed or backtrack based on the verification step. However, in the absence of verification steps, preferred methods according to the present invention proceed with seglists 414, 416 (that is, candidates for the next step) as shown in FIG. 4. When trying out seglist 414, because the login does not succeed, DisambiguateTarget cannot identify any target element for quantity in segment 5.1.1. Seglist 416 also fails as a workable candidate. Because all of the possibilities for the next step fail, ExecuteATDList backtracks. This backtrack happens all the way to Loop 7-14 in HandleTestCase. More specifically, HandleTestCase invokes HandleSegList with candidate seglist 410. Seglist 410 does work, as shown by the fact that its constituent steps 4.3.1 and 4.3.2 (see index for flowchart 400 set forth above) match step 4 of the manual test case.

Empirical evaluation will now be discussed. In a first study, the approach was evaluated in an end-to-end manner, including executing the generated test actions. Two open-source web applications were used, with a corpus of manual tests written by professional testers for the purpose of this study. In the second study, two commercial applications were used, with a small suite of real manual tests for the applications, to evaluate the effectiveness of segmentation and segment interpretation.

In our prototype, a Stanford NLP Parser was used for parsing segments and for extracting ATD-tuples from segments. In particular, Parts-of-speech (POS) tagging is first performed for each word within the segment using the NLP Parser. Verbs and nouns are next identified within the segments. In a few scenarios, target labels (such as "user name") in the application under analysis can include multiple words that result in incorrect POS tagging of those words, and at least some preferred embodiments of the present invention may identify these words that result in incorrect POS tagging. To address this issue, a repository is maintained of all labels and data values in the application under analysis and explicitly tag those multiple words as a single noun. Next, consideration is made of: verbs as actions and nouns as target elements or data values. The primary reason for the ambiguity between target elements or data values is that the technique does not impose any restrictions on the format of the test step. The technique disambiguates a noun as a target element or a data value by using the runtime information available in the later phases. To extract relations between actions and targets, dependency relations identified by the parser are exploited. For example, consider a test step as enter login guest. The NLP parser generates the following output:

POS tagging: enter/VB login/NN guest/NN
Dependency relations: dobj(enter, guest), nn(guest, login)

The preceding output shows that the NLP Parser tagged Enter as verb, and login and guest as nouns. Using relations dobj (direct object) and nn (noun modifier), the prototype extracts an ATD-tuple (enter, guest, login) of the form (a, t, d). In the prototype, 21 dependency relations are used for extracting ATD-tuples. As shown, the prototype does not have knowledge whether guest is a data value or a target element during parsing.

To gather runtime information from the application under analysis and to execute extracted ATD-tuples, the prototype uses HtmlUnit. HtmlUnit is a GUI-less browser for Java programs and provides APIs for various actions such as clicking buttons or filling out forms. Given an ATD-tuple, the technique extracts all Html elements in the current webpage and identifies candidate targets for the ATD-tuple using both target t and data value d of the ATDtuple (a, t, d). It is also identified that testers may not mention the exact name of the Html element. To address this issue, Levenshtein edit distance is leveraged to identify the Html elements that are similar to the target described in the test step.

In a few scenarios, due to ambiguities in the test step, there can be multiple candidate Html elements on which the action a of (a, t, d) needs to be performed. The prototype extracts all such candidates and systematically executes those ATD-tuples via backtracking. The prototype next uses HtmlUnit for executing the ATD-tuple. Based on the output, the prototype either proceeds with the next segment (if successful) or backtracks to another candidate ATD-tuple (in case of failure).

The goal of the first study was to demonstrate that the approach can automatically interpret and execute the natural-language test cases. Moreover, this study also shows the importance of identifying valid segments and disambiguating targets. For this study, two popular open-source web applications were used: BookStore and BugTracker.

To create manual test cases for the two subject applications, a few scenarios were identified and two professional testers were requested to create the manual test cases for those scenarios. The testers were unaware of the present invention's tool and technique, and of the goal of the study (that is, the evaluation of a test-automation tool). The only instructions they were given were to be elaborate in writing the tests and mention the test data wherever needed. They were given no instructions on the levels of segmentation and different ambiguities. Thus, there is practically no bias in the creation of the test cases. In total, testers wrote 23 manual test cases (11 for BookStore and 12 for BugTracker), which consisted of 117 steps.

While analyzing the tests, a valuable side-benefit of our approach was discovered—that it can identify incomplete manual test cases. If after attempting to execute each alternative interpretation, the tool is unable to find an executable flow, it has likely identified an incomplete/incorrect test case. In some cases, the tool may fail because of some other factors or because the application itself is incorrect (so it is not the oracle for the test cases). But, it is highly likely that the tests are incomplete and/or incorrect. In fact, this is exactly what was found for some of the manual tests for BookStore and BugTracker. For example, some of the study's test cases do not include the step for logging into the web application. This logging step is required for performing the other actions mentioned in the test step. The primary reason for such missing steps is that the testers were not aware that these test cases were requested for the evaluation of our test-automation tool. But, nonetheless, these tests illustrate the power of the present invention's approach.

To address this issue of missing steps, minor enhancements to the test cases were made. In particular, various enhancements, respectively falling into three categories of enhancements, were made. The first category of enhancement is insertion of missing steps, such as login steps. The second category of enhancement is the addition of hints to the step to identify target. More specifically, in a few steps, it was found that there is no information available for identifying the target. For example, consider the following step: "Select the Book of your choice from the list of all Search Results displayed and then click either on the image of the book or on Name of the Book." The human-enhanced step read as follows: "Select a title from the list of all Search Results displayed and then click either on the image of the book or on Name of the Book." The third category of human enhancement is to modify the format of a manual test case representation step. For example, the following step: "Fill The Registration Form With Appropriate Details for mandatory Fields Login* Password* Confirm Password* First Name* Last Name* Email* Then Click "Cancel" Button" was enhanced as follows: "Fill The Registration From With Appropriate Details for mandatory Fields. Fill Login, Password, Confirm Password, First Name, Last Name, and email, Then Click "Cancel" Button." Overall, the present invention can be highly effective in automatically executing test cases written in stylized natural language with or without some degree of human intervention. It is believed that embodiments of the present invention will become even more helpful, comprehensive and/or accurate over time as improvements are made to the algorithms and/or methods.

The goal of the second study was to evaluate the approach on real commercial applications and manual test cases. These tests focused the evaluation on the accuracy of segmentation and segment interpretation; the interpreted test actions could not be performed and, therefore, the approach could not be evaluated end-to-end. It was found that a large fraction of manual test steps are required to be split into segments before an automation task becomes meaningful. On average, 87% of the 445 steps that needed segmentation are composed of just two segments. But, it was found that test steps that contain as many as six segments. In most cases, either the composite test step strings together multiple segments with punctuations and/or conjunctions, or it contains a "from" clause.

For example, consider the following test step: "User selects a provider from the left side-bar menu and clicks [update provider]." This test step resolves to three ATD tuples: (i) <goto, left side-bar menu>; (ii) <select,provider>;

and (iii) <click, [update provider]>. One split happens corresponding to the "and"; a "goto" segment is introduced for the "from" clause.

To evaluate the accuracy of the segmentation approach, precision and recall of retrieving segments from the set of composite manual steps is measured, where segmentation was necessary. Let, AS denote the set of segments that can be potentially derived from CS and RS denote the set of segments retrieved by running the prototype on CS. Then, precision and recall can be computed by Equations (1) and (2) as follows:

$$\text{Precision} = \frac{|AS \cap RS|}{|RS|}, \text{Recall} = \frac{|AS \cap RS|}{|AS|}$$

For one of the applications used in this study, both precision (97.3%) and recall (98.4%) were very high. The cases for the other application were complex—many sentences are long-winding, with a wide variety of constructions of clauses. As a result, many spurious segments are identified and precision drops to 69%, even as recall remains high at 96.9%. As a strategy, the approach sacrifices precision to retain high recall rates. It was realized that spurious segments, which bring down precision, can be easily discarded at runtime (as illustrated by the results of the study involving BookStore and BugTracker described above)—invalid targets/actions would not be resolved successfully at runtime, and the approach would backtrack to the previous state to execute the next (possibly correct) alternative. However, it is important not to miss any segment in the list of segments (that is, keep the recall high), so that all candidate segments can be evaluated by the runtime interpretation.

It was also studied to try to determine how effectively an embodiment of the present invention can interpret segments not only to identify the correct verb that indicates action, but also to zero in on the target to be used by the runtime for target disambiguation. As explained earlier, the tool's output was contrasted with the interpretation of a human to classify interpretations for segments as: correct, incorrect and ambiguous. Moreover, the number of cases where the tool fails to report any interpretation for a segment identifiable by the human was listed. On average, the embodiment could precisely determine both the action and the target in 82.9% of segments. Only in 10.5% of cases, did the tested embodiment of the present invention prove to be inferior to human interpretation. In approximately half of these imprecise cases, the tool is not able compute any interpretation; for the remaining, it reported incorrect results. An interpretation was considered to be incorrect if it cannot point out the most apt verb present in the sentence as the action, or if it misses the most useful phrases that can serve as the context for disambiguating the target. For example, consider the following segment: "Click edit from the right hand action menu." This segment was incorrectly resolved to the following tuple: "<edit, menu, right-hand-action>." Clearly, "click" should have been correct action verb and not "edit." Finally, it was reported that 6.6% segments were ambiguous. Three main classes of ambiguities were stipulated. First, it has been found that many manual test steps and segments derived thereof, exist at a higher level of abstraction than what the runtime can handle. Ideally, a segment should specify an atomic unit of performance action on a target. However, examples were found, such as: "Complete the workflow to publish the bulletin." This manual test case representation step does not give a clear idea on what action needs to be performed. Second, there are instances where there is insufficient data to perform disambiguation of the target. For example, consider the following step: "Fill in the details on the page." The action "fill in" makes it clear that text fields are of interest as targets, but does not indicate which ones. Third, there may be non-standard verbs used in manual steps that may not be resolved by the runtime. Resolution of an action is particularly hard when both the action and target are ambiguous. In several cases, the action can be disambiguated from the target and vice-versa. For example, consider the following segment: "<Add,approver,>." "Add" is a non-standard action verb unlike "click," "enter, etc. Depending upon whether the target context "approver" is resolved to a list or a button, it can be decided whether to add an element or to click. However, if the target context cannot be resolved, the segment cannot be performed.

The results indicate that the backtracking-based approach is remarkably effective in being able to interpret and execute manual test cases even in the presence of different types of ambiguities. But there currently are limitations of the technique. Mechanical interpretation of natural-language tests presents many other challenges; here are mentioned some of such difficult cases that were found in the corpus of test cases. For example, cases were found where a test step made a cross reference to another test case. Another example of a difficult scenario involves looping over test steps, as shown in the following example: "Repeat the steps above; select only technical reviewer and approver." This step instructs the tester to perform the previous steps again with some variations. Whereas for a human, interpreting this step may not be difficult, for a computer, the interpretation can be challenging.

We also found examples of dependences between test steps, for example, where a subsequent test step referred to a data value used in the preceding step. An example of such a test step is: "Enter with New Login ID and Password." This step instructs the tester to enter the ID and password created in a preceding test step.

Figure 5:
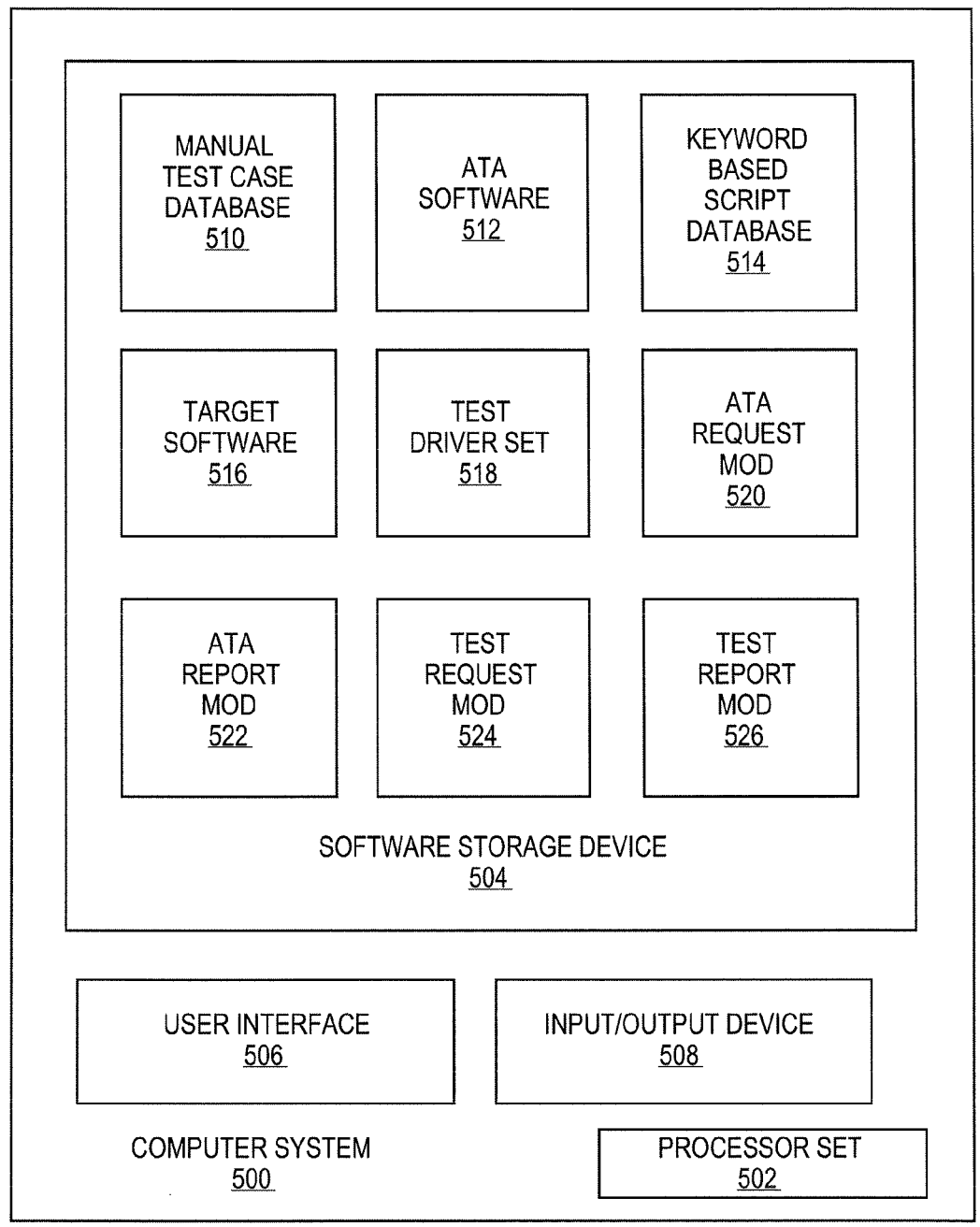
FIG. 5 is a schematic view of a first embodiment of a computer system according to the present invention.

FIG. 5 shows a computer system 500 according to the present invention including: a processor set 502; user interface 506; input/output device 508; and computer software storage device 504. Software store device 504 has tangibly stored thereon: manual test case database 510; ATA software 512; keyword-based script database 514; target software 516; test driver set 518; ATA request module 520; ATA report module 522; test request module 524; and test report module 526. The computer system may be a standalone computer system, or it may be distributed over a network or in a cloud. The user interface: (i) allows a human user to interact with the computer system (for example, request conversion of a manual test case representation into a keyword-based test case representation); and (ii) may include, for example, a display, a keyboard and a mouse. The input/output device: (i) allows the computer system to receive and send data (for example, the sending of a newly-generated keyword-based test case representation to other computer systems (not shown)); and (ii) may include a physical data storage medium or a network data transfer connection.

Manual test case database 510 stores manual test case representations that have been prepared by testers. Target software 516 stores code for the target software for which a machine-readable test case is to be prepared. Target software 516 may be a browser-based application or it may be any other type of software. In preferred embodiments of the present invention: (i) the target software is an application that runs on a browser; and (ii) target software 516 would include a browser suitable for running the target software (for example, the GUI-less browser mentioned above). Manual test case database 510 and target software 516 provide ATA software the inputs that it needs to generate a machine-readable test case representation, which, in this embodiment of the present invention, is a keyword-based test case representation. In other embodiments, the ATA software may provide other types of representations, such as a specialized script language representation, a traditional script language representation (see, FIG. 2) or other types of test case representations to be developed in the future.

Keyword based script database 514 stores the keyword-based test case representations that are generated by ATA software 512. Test driver set 518 can run the keyword-based representations and/or scripts that are: (i) under development by ATA software 512; and/or (ii) stored in database 514.

ATA request module 520 allows a user to request the generation of a new keyword-based test case representation by specifying: (i) a manual test case representation to be converted; and (ii) the target software. ATA report module 522 reports back on the results of the requested keyword-based test case representation generation. For example, if the ATA software was unable to generate a keyword-based test case representation due to an incomplete manual test case, then this result would be reported through ATA report module 522.

Test request module 524 allows a user to request an automated test of a target software by specifying: (i) a keyword-based script from keyword-based script database 514; and (ii) the target software. Test report module 526 reports back on the results of the requested automated test.

Figure 6:
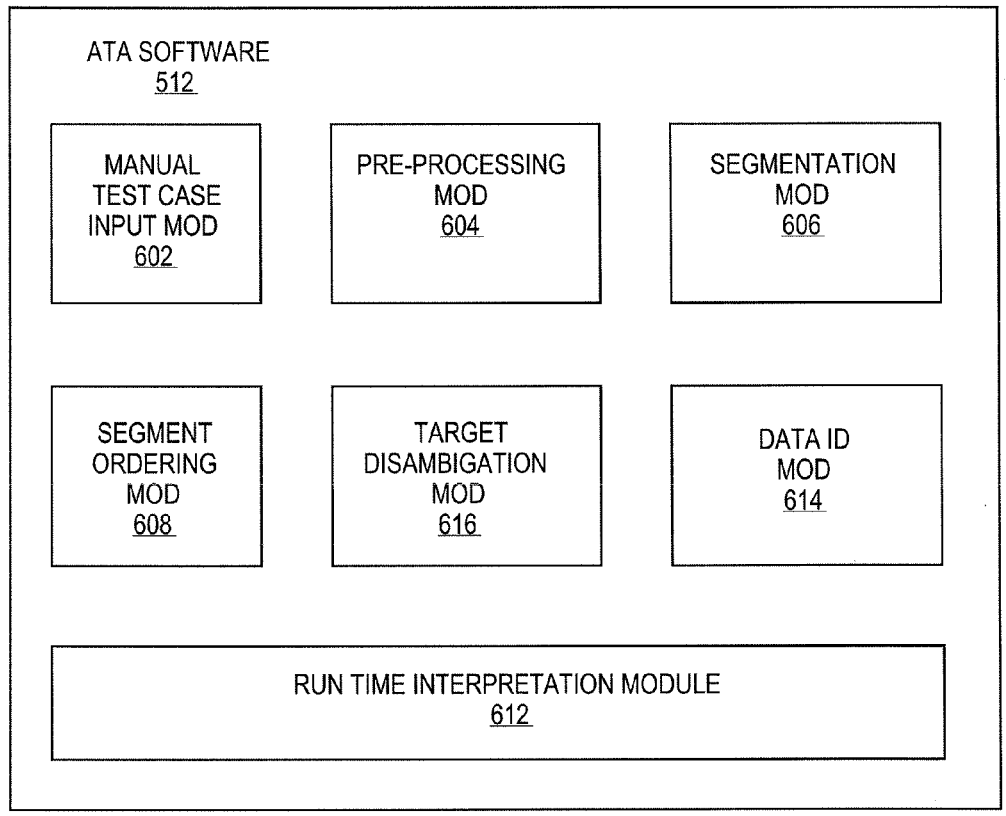
FIG. 6 is a schematic view of a first embodiment of software used in the first embodiment computer system.

FIG. 6 shows ATA software 512 including: manual test case input module 602; pre-processing module 604; segmentation module 606; segment ordering module 608; target disambiguation module 616; data identification module 614; runtime interpretation module 612. The software generally works as described above in connection with schematic 300 of FIG. 3.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

DEFINITIONS

Any and all published documents mentioned herein shall be considered to be incorporated by reference, in their respective entireties. The following definitions are provided for claim construction purposes:

Present invention: means "at least some embodiments of the present invention," and the use of the term "present invention" in connection with some feature described herein shall not mean that all claimed embodiments (see DEFINITIONS section) include the referenced feature(s).

Embodiment: a machine, manufacture, system, method, process and/or composition that may (not must) be within the scope of a present or future patent claim of this patent document; often, an "embodiment" will be within the scope of at least some of the originally filed claims and will also end up being within the scope of at least some of the claims as issued (after the claims have been developed through the process of patent prosecution), but this is not necessarily always the case; for example, an "embodiment" might be covered by neither the originally filed claims, nor the claims as issued, despite the description of the "embodiment" as an "embodiment."

First, second, third, etc. ("ordinals"): Unless otherwise noted, ordinals only serve to distinguish or identify (e.g., various members of a group); the mere use of ordinals shall not be taken to necessarily imply order (for example, time order, space order).

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (ii) in a single proximity within a larger piece of software code; (iii) located within a single piece of software code; (iv) located in a single storage device, memory or medium; (v) mechanically connected; (vi) electrically connected; and/or (vii) connected in data communication.

Software storage device: any device (or set of devices) capable of storing computer code in a non-transient manner in one or more tangible storage medium(s); "software storage device" does not include any device that stores computer code only as a signal.

keyword-based script/keyword-based test case representation: a machine-readable script that includes only steps which are each respectively in the form of a tuple; each tuple must include at least an action and a target and may further include a data value; a keyword-based test case representation is a keyword-based script that includes at least one end-to-end test for a complete piece of target software; while keyword-based scripts may be generated for use with any kind of target software, at least some preferred embodiments of the present invention are directed to generation of keyword-based scripts for use with applications that run on browsers, and herein these are more specifically referred to as browser-application keyword-based scripts; at least some preferred embodiments of the present invention are directed to generation of keyword-based scripts that require a test driver to run the script, and herein these are more specifically referred to as test-driver-run keyword based scripts.

machine-readable script/machine-readable test case representation: a set of machine readable instructions for the testing of software that can be read and performed by a computer with no human intervention; some machine-readable scripts may require intervening software for their performance, such as a custom interpretation engine or a test driver; a machine-readable test case representation is herein defined as a machine-readable script that includes at least one end-to-end test for a piece of target software; while machine-readable scripts may be generated for use with any kind of target software, at least some preferred embodiments of the present invention are directed to generation of machine-readable scripts for use with applications that run on browsers, and herein these are more specifically referred to as browser-application machine-readable scripts.

Unless otherwise explicitly provided in the claim language, steps in method or process claims need only be performed that they happen to be set forth in the claim only to the extent that impossibility or extreme feasibility problems dictate that the recited step order be used. This broad interpretation with respect to step order is to be used regardless of alternative time ordering (that is, time ordering of the claimed steps that is different than the order of recitation in the claim) is particularly mentioned or discussed in this document. Any step order discussed in the above specification, and/or based upon order of step recitation in a claim, shall be considered as required by a method claim only if: (i) the step order is explicitly set forth in the words of the method claim itself; and/or (ii) it would be substantially impossible to perform the method in a different order. Unless otherwise specified in the method claims themselves, steps may be performed simultaneously or in any sort of temporally overlapping manner. Also, when any sort of time ordering is explicitly set forth in a method claim, the time ordering claim language shall not be taken as an implicit limitation on whether claimed steps are immediately consecutive in time, or as an implicit limitation against intervening steps.

The invention claimed is:

1. A computer system comprising:
   a processor set comprising at least one processor;
   and a software storage device;
      wherein: the processor set is structured, programmed and/or connected in data communication with the software storage device so that the processor set performs machine-readable instructions stored on the software storage device;
      the software storage device includes the following:
   a manual test case database comprising at least a first manual test case representation including at least one test step described in a natural language without format restrictions, ATA software, and first target software;
      wherein the first manual test case is a manual test case for performing a test on the first target software; and
      the ATA software is programmed to generate a first machine-readable keyword-based script test case representation corresponding to the first manual test case representation including:
         automatically identifying at least one sequence of potential action-target-data (ATD) tuples, including at least one potential ATD tuple, based on the at least one test step in the first manual test case representation;
         running each potential ATD tuple against the target software to determine if the potential ATD tuple is a correct ATD tuple for automated testing;
         recording each correct ATD tuple as part of the of the keyword-based script test case representation.

2. The system of claim 1 wherein: the first target software is in the form of an application that runs on a browser; and the ATA software is further programmed so that first machine-readable test case representation, corresponding to the first manual test case representation, is in the form of a first browser-application keyword-based script test case representation.

3. The system of claim 1 wherein: the software storage device further includes a test driver set; and the ATA software is further programmed so that first machine-readable test case representation, corresponding to the first manual test case representation, is in the form of a first test-driver-run keyword-based script test case representation.

4. The system of claim 1 wherein:
   the ATA software comprises: a segmentation module, a segment ordering module, a target disambiguation module, a data identification module, and a runtime interpretation module;
   the segmentation module is programmed to identify potential segment sets for each step of the first manual test case representation where each potential segment set includes at least one potential segment;
   the segment ordering module is programmed to determine potential orderings for potential segment sets for potential segment set that includes more than one potential segment;
   the target disambiguation module is programmed to determine potential targets for each potential segment of each potential segment set;
   the data identification module is programmed to identify potential data values for each potential segment of each potential segment set; and
   a runtime interpretation module is programmed to run potential segment sets on the target software to determine: (i) which potential segment sets are correct segment sets for the first keyword-based script test case representation, (ii) which potential orderings are correct orderings for the first keyword-based script test case representation, and (iii) which potential targets are correct targets for the first keyword-based script test case representation.

5. A non-transitory computer-readable medium storing ATA software therein, the ATA software comprising:
   an input module programmed to receive a first target software and a first manual test case representation including at least one test step described in a natural language without format restrictions written for the first target software;
   an automating-test-automation module programmed to generate a first machine-readable keyword-based test case representation corresponding to the first manual test case representation including:
      automatically identifying at least one sequence of potential action-target-data (ATD) tuples, including at least one potential ATD tuple, based on the at least one test step in the first manual test case representation;
      running each potential ATD tuple against the target software to determine if the potential ATD tuple is a correct ATD tuple for automated testing;
   recording each correct ATD tuple as part of the of the keyword-based script test case representation; and
   an output module programmed to output the first machine-readable keyword-based script test case representation.

6. The medium of claim 5 wherein: the first target software is in the form of an application that runs on a browser; and the automating-test-automation module is further programmed so that first machine-readable test case representation, corresponding to the first manual test case representation, is in the form of a first browser-application keyword-based script test case representation.

7. The medium of claim 5 wherein the automating-test-automation module is further programmed so that first machine-readable test case representation, corresponding to the first manual test case representation, is in the form of a first test-driver-run keyword-based script test case representation.

8. The medium of claim 5 wherein:
the automating-test-automation module comprises: a segmentation sub-module, a segment ordering sub-module, a target disambiguation sub-module, a data identification sub-module, and a runtime interpretation sub-module;
the segmentation sub-module is programmed to identify potential segment sets for each step of the first manual test case representation where each potential segment set includes at least one potential segment;
the segment ordering sub-module is programmed to determine potential orderings for potential segment sets for potential segment set that includes more than one potential segment;
the target disambiguation sub-module is programmed to determine potential targets for each potential segment of each potential segment set;
the data identification sub-module is programmed to identify potential data values for each potential segment of each potential segment set; and
the runtime interpretation sub-module is programmed to run potential segment sets on the target software to determine: (i) which potential segment sets are correct segment sets for the first keyword-based script test case representation, (ii) which potential orderings are correct orderings for the first keyword-based script test case representation, and (iii) which potential targets are correct targets for the first keyword-based script test case representation.

9. A method for converting a manual test case representation into a machine-readable test case representation, the method comprising the following steps:
providing first target software and a first manual test case representation including at least one test step described in a natural language without format restrictions written for the first target software;
generating a first machine-readable keyword-based script test case representation corresponding to the first manual test case representation using ATA software including:
automatically identifying at least one sequence of potential action-target-data (ATD) tuples, including at least one potential ATD tuple, based on the at least one test step in the first manual test case representation;
running each potential ATD tuple against the target software to determine if the potential ATD tuple is a correct ATD tuple for automated testing;
recording each correct ATD tuple as part of the of the keyword-based script test case representation; and
outputting the first machine-readable keyword-based script test case representation.

10. The method of claim 9 wherein: the first target software is in the form of an application that runs on a browser; and at the generation step, the first machine-readable test case representation, corresponding to the first manual test case representation, is generated to be in the form of a first browser-application keyword-based script test case representation.

11. The method of claim 9 wherein, at the generation step, the first machine-readable test case representation, corresponding to the first manual test case representation, is generated to be in the form of a first test-driver-run keyword-based script test case representation.

12. The method of claim 9 wherein:
the generating step is substantially performed by ATA software comprising: a segmentation module, a segment ordering module, a target disambiguation module, a data identification module, and a runtime interpretation module;
the segmentation module is programmed to identify potential segment sets for each step of the first manual test case representation where each potential segment set includes at least one potential segment;
the segment ordering module is programmed to determine potential orderings for potential segment sets for potential segment set that includes more than one potential segment;
the target disambiguation module is programmed to determine potential targets for each potential segment of each potential segment set;
the data identification module is programmed to identify potential data values for each potential segment of each potential segment set; and
the runtime interpretation module is programmed to run potential segment sets on the target software to determine: (i) which potential segment sets are correct segment sets for the first keyword-based script test case representation, (ii) which potential orderings are correct orderings for the first keyword-based script test case representation, and (iii) which potential targets are correct targets for the first keyword-based script test case representation.

* * * * *